Jan. 21, 1936.  M. E. HAWORTH  2,028,211
FLUID STREAM CONTROL
Filed Feb. 18, 1931
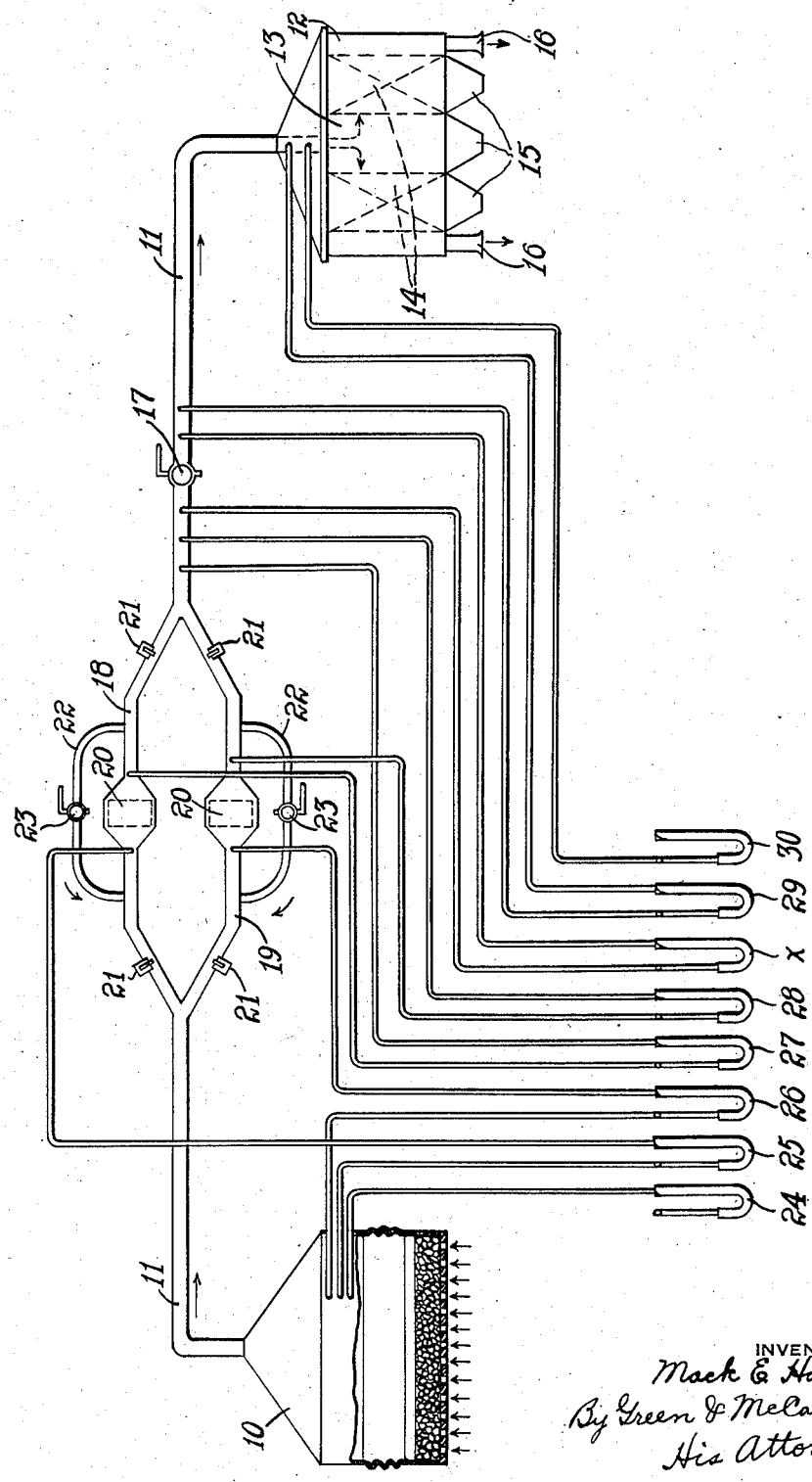
INVENTOR
Mack E. Haworth
By Green & McCallister
His Attorneys Patented Jan. 21, 1936

2,028,211

UNITED STATES PATENT OFFICE 2,028,211

FLUID STREAM CONTROL

Mack E. Haworth, Pittsburgh, Pa., assignor to The Jeffrey Manufacturing Company, a corporation of Ohio Application February 18, 1931, Serial No. 516,632

9 Claims. (Cl. 209—502)

This invention relates to the control of fluid streams and particularly to an arrangement whereby a constant weight or buoyancy of fluid stream per unit of time can be delivered irrespective of changes in pressure, temperature, humidity and/or resistance.

In the treatment of coal, for example, wherein the coal is buoyed by a fluid stream there is great difficulty in securing uniformity of result due to the ever changing conditions in the system. Particularly, resistances or variations may occur especially on account of the varying atmospheric conditions as to temperature, pressure and humidity and as to resistances to flow within the system itself due to mechanical limitations or variations in the material acted upon.

One of the objects of the present invention is to provide a system which will obviate all hitherto accepted defects of which I am aware and which will, moreover, procure additional advantages peculiar to its own construction.

More specifically an object of the invention is to provide a fluid stream for desired purposes which is in excess of actual requirements but which is regulated to bring it to a predetermined value.

Another object is to generate a fluid stream in excess of requirements and then vary the resistances in the system in which it is used so as to diminish it to a desired value.

A further object is to generate a stream of air or the like which can be used to deliver a constant weight or buoyancy per unit of time regardless of changes in atmospheric pressure, temperature and humidity conditions.

A still further object is to generate a fluid stream at constant speed and so control the resistance thereto in the system in which it is used as to obtain a constant buoyancy at a predetermined point in the system.

Other and further objects and advantages will be understood from the following disclosure and by those skilled in the particular art.

I have schematically illustrated my invention in the accompanying drawing which represents a suitable layout in a typical instance.

Referring first to the drawing there is illustrated a portion of a machine for the cleaning of coal or the like constructed substantially in accordance with my copending application, Serial No. 448,493, filed April 30, 1930 for Coal cleaning apparatus in operative association with the system forming the present invention.

I have found that the efficiency of the stratification in such a machine depends upon the fluid stream and that in order to maintain constancy of stratification, it is necessary to maintain the same buoyancy under all conditions affecting the density of the air which is ordinarily used for the fluid stream in the separation of coal or the like from its impurities by the pneumatic or dry process. With a certain depth of material bed and depending upon the specific gravity of the separation desired, I have further found that a certain buoyancy is required to produce free settling action and efficient stratification.

After having determined the value of the buoyancy required and the volumes of air required through certain sections of the deck for certain separations under certain conditions of temperature, pressure, humidity and resistance, I found that in order to maintain the same efficiency under other conditions it is necessary to maintain a buoyancy under the changed conditions equivalent to that under the original conditions.

At constant speed, under the same conditions, blowers deliver a constant volume but the static pressure varies directly with the density of the fluid stream and the horsepower varies directly with the static pressure. The density of the fluid stream in turn is affected by humidity, temperature, pressure, and change in the static pressure.

I have discovered that I can maintain constant conditions of buoyancy by changing the speeds of the blowers to those required to produce the volumes necessary to develop the same or equivalent buoyancy under different conditions. I have further discovered, however, that it is better to operate the blowers at constant speed and to effect the necessary changes by regulation.

At constant speed a blower delivers a constant volume of air at constant air density, and, as the density of the air changes, the volume passing through the blower changes even though the blower operates at constant speed. To maintain constant blower operation I operate the blowers at constant speed to deliver constant volume at constant total static or dynamic pressure against the blower. I operate these blowers so that the constant speed is of such a value that more air is delivered than is required through the table deck for the desired buoyancies to adequately take care of any reduced buoyant effect due reduced air density. The effective volume is then secured by regulation.

Since, however, the volume delivered by a blower is affected by the total resistance against which it operates, it follows that to operate a blower at constant volume it is necessary to operate it against a constant head or resistance. Again, as the static or dynamic efficiency of a blower changes with a change in volume and/or a change in pressure, it is necessary to operate it at a constant head or resistance in order to deliver a constant volume. In the present case, as an example, the resistance or head is affected by a change in resistance in the deck or a change in the resistance of materials in or on the deck; by a change in the suction resistance; by a change in the discharge resistance; and by a change in dust arrester resistance.

To correct for a change in any of these resistances, a main damper, hereinafter described, is positioned in the discharge duct between the blowers and the dust arrester, but it could be as effectively installed on the suction side of the blowers if so desired. This creates an artificial resistance equal to or slightly greater than any likely change in resistance in the remainder of the system. This resistance is furthermore a variable one to compensate for any such change in the remainder of the system.

As a result I provide blowing means which will deliver a constant volume of air at constant speed, but the blowing apparatus is so chosen that an excess will be supplied. Leading from the hood 10 of my coal cleaning apparatus is a main duct 11 which leads ultimately to a dust arrester 12, of suitable or desired construction having a settling chamber 13, screens 14, dust hoppers 15 and exhausts 16. Interposed in said main duct between said coal cleaning machine and said dust arrester is a main valve or damper 17 of a suitable type which, in the well known manner, is permitted to present a desired constriction to the flow of fluid in said duct, that is, the available internal diameter of the duct is thereby adjusted to let more or less fluid pass thereby, thus introducing respectively a lesser or greater resistance or back pressure into said main duct.

Intermediate of said main damper and said coal cleaning machine, said duct is divided into branches 18 and 19 in each of which is located a suitable constant speed fan 20, these fans being adapted to create a desired suction or buoyancy in the hood of the coal cleaning machine. Each fan is identical, although conceivably they might be different and they are of any suitable type. In said branches are the auxiliary dampers 21, the purpose of which is evident. In each branch of said duct a by-pass duct 22 connects the suction and pressure sides of the fans and in each of these by-pass ducts there is a by-pass valve 23. It is thus clear that a proportion of the fluid stream flowing through each branch 18 and 19 can be by-passed around the fan, the amount by-passed being regulated by the diameter of the by-pass duct, but also by the by-pass valve which acts in generally the same manner as main damper 17.

It is desired in the present invention to maintain a constant resistance against the fans so as to have a selected diminution in the stream which is being supplied at constant speed, but in excess of requirements, so as to have a resultant resistance in the system of a predetermined amount. In other words, means is provided, under the same conditions, for cutting down the main stream a constant amount so as to have a resultant constant buoyancy for use to effect efficient stratification and cleaning of the coal. In order that this may the better be controlled, I provide a number of gauges leading to desired points in the system whereby I may determine or indicate the resistance between any two desired points thereof. For this purpose, I have provided the gauges or manometers which are only diagrammatically shown on the drawing to avoid confusion and gauge 24, for example, indicates the resistance in the deck and bed of material; gauge 25 indicates the suction resistance of one of the fans 20; gauge 26 is the same as 25 but for the other fan 20; gauges 27 and 28 indicate the resistance between the respective fans and the main damper; gauge 29 indicates the resistance between the main damper and the dust arrester; gauge 30 indicates the resistance of the dust arrester; and gauge X indicates the resistance of the main damper which is naturally variable according to the position thereof. The object of this arrangement is primarily the maintenance of the system at a constant resistance. To accomplish this, the resistance in the various gauges with the exception of that (X), indicating the main damper resistance, are properly combined and the resistance of the main damper is so adjusted as to maintain a predetermined value. For example, if it is desired that the total resistance of the system be equivalent to 12 inches of water and if the sum of the resistances with the exception of the main damper be 9.75 inches, then the main damper is so adjusted that it shall have a resistance equal to the difference, namely 2.25 inches. To control the resistance of the system, gauges 25 and 26 are made to read the same by adjusting inlet dampers 21, 21 and gauges 27 and 28 are made to read the same by adjusting outlet dampers 21, 21. The total resistance of the system may then be maintained constant by maintaining the sum of all the gauge readings constant. While the total resistance of the system is not given by the sum of all the gauge readings, it is approximately given by the sum of the gauge readings, omitting the readings of gauges 25 and 27 or 26 and 28, assuming the gauge readings of said included gauges 25 and 27 or 26 and 28 to be a small part of the total reading, as is usually the case.

Secondary or minor variations when required may be carried out by the auxiliary dampers 21, no particular discussion of which is believed required.

If I so desire, I may provide either for manual operation or for electrical operation which involves the use of electrical apparatus sufficiently sensitive to operate motors and control units so as to maintain the energy input into the blower drive unit at a constant value. This regulation is for the by-pass valves 23 with the purpose of so regulating such valves that the by-pass ducts will dissipate, by recirculation, the difference in the volume required through the deck and the volume passing through the blowers. As already stated, the by-pass ducts conduct approximately the proper amount of the stream from the discharge side of the same to the suction side. Hence, the precise volume flowing through the by-pass is regulated by the by-pass valves to an amount which will be equal to the difference between the blower capacity at that speed and the volume required through the deck.

Instead of the gauges represented on the drawing, I may substitute suitable electrical instruments, or I may apply such instruments in operative association with said gauges or interlock the two such that the sum of the gauges will be electrically added and the sum of all the resistances be automatically and electrically maintained at a predetermined value, such as disclosed in my copending application for Fluid stream control, Serial No. 540,059 filed May 26, 1931.

I have discovered, therefore, that either by manual or by automatic control the blowers, which may be operated singly or in parallel combinations, such as illustrated, may be operated at constant speeds to deliver constant volumes against constant pressures requiring constant energy input into their prime movers and at the same time obtain variable volumes through the material bed as predetermined for the buoyancy required for free settling or efficient stratification.

The above disclosure is intended to be more illustrative than limitative and I may, for example, utilize the principles of the present invention in other operations wherein they are applicable. In one such instance, in connection with blowers, cupolas, etc., a certain weight of oxygen is required per unit of time for combustion purposes. As the density of the air changes, the volume of oxygen changes in a blower delivering a constant volume. However, as a constant weight of oxygen is required per unit of time for the combustion of materials in the boiler furnaces, or in the cupolas, it is necessary to vary the volume of air through the furnaces or cupolas as the air density changes in order to deliver the same weight of oxygen per unit of time. This may readily be done by means of my invention.

What I claim as new and desire to secure by Letters Patent is:

1. A main duct, branched intermediate its ends to contain a plurality of blower means, a blower means in each branch, a main damper in said duct, by-pass ducts in said branches extending from the pressure to the suction side of said blower means, and valves in said by-pass ducts.

2. A main duct, branched intermediate its ends to contain a plurality of blower means, a constant speed blower means in each branch, a main damper in said duct on the pressure side of said blower means, by-pass ducts in said branches extending from the pressure to the suction side of said blower means, and valves in said by-pass ducts.

3. A main duct, branches intermediate its ends to contain a plurality of blower means, a blower means in each branch, a main damper in said duct on the pressure side of said blower means, by-pass ducts in said branches extending from the pressure to the suction side of said blower means, and valves in said by-pass ducts, said branches having auxiliary damper means.

4. In a main duct, branches intermediate its ends to contain a plurality of blower means, a constant speed blower means in each branch, an adjustable main damper in said duct, by-pass ducts in said branches extending from the pressure to the suction side of said blower means, adjustable valves in said by-pass ducts, and means for measuring the resistances of predetermined portions, the total resistance whereof is maintained constant by said adjustable damper and valves.

5. A main duct, branches intermediate its ends to contain a plurality of blower means, a constant speed blower means in each branch, an adjustable main damper in said duct on the pressure side of said blower means, by-pass ducts in said branches extending from the pressure to the suction side of said blower means, adjustable valves in said by-pass ducts, and means for measuring the resistances of predetermined portions, said damper and valves maintaining a constant total resistance against said blower means.

6. A main duct, branches intermediate its ends to contain a plurality of blower means generating excess fluid stream, a constant speed blower means in each branch, an adjustable main damper in said duct on the pressure side of said blower means to present a variable resistance to said blower means, by-pass ducts in said branches extending from the pressure to the suction side of said blower means, and adjustable valves in said by-pass ducts to further affect the resistance to said blower means, said branches having auxiliary damper means, and means for measuring the resistances of predetermined portions, the adjustable resistances having such values as to obtain a constant total resistance against said blower means.

7. A coal cleaning machine, a dust collector, a duct connecting said coal cleaning machine and dust collector, means for creating a fluid stream flowing from said coal cleaning machine to said dust collector, and a variable resistance in said duct, said duct being branched, and said fluid stream creating means comprising a blower in each branch.

8. A coal cleaning machine, a dust collector, a duct connecting said coal cleaning machine and dust collector, means for reating a fluid stream flowing from said coal cleaning machine to said dust collector, and a variable resistance in said duct, said duct being branched, and said fluid stream creating means comprising a blower in each branch, a by-pass duct connecting the pressure and suction sides of the blower in each branch.

9. A coal cleaning machine, a dust collector, a duct connecting said coal cleaning machine and dust collector, means for creating a fluid stream flowing from said coal cleaning machine to said dust collector, and a variable resistance in said duct, said duct being branched, and said fluid stream creating means comprising a blower in each branch, a by-pass duct connecting the pressure and suction sides of the blower in each branch, and a variable resistance in each said by-pass duct.

MACK E. HAWORTH.